United States Patent [19]

Ayers

[11] Patent Number: 4,618,388

[45] Date of Patent: Oct. 21, 1986

[54] WATER REMOVING FILTER MEDIA AND METHOD OF MAKING THE SAME

[75] Inventor: William R. Ayers, Bement, Ill.

[73] Assignee: Central Illinois Manufacturing Co., Bement, Ill.

[21] Appl. No.: 649,502

[22] Filed: Sep. 11, 1984

Related U.S. Application Data

[60] Division of Ser. No. 447,909, Dec. 8, 1982, which is a continuation-in-part of Ser. No. 413,981, Sep. 2, 1982.

[51] Int. Cl.$^4$ ............................................. B01D 39/16
[52] U.S. Cl. ................................. 156/284; 210/497.1; 210/502.1
[58] Field of Search ...................... 156/283, 284, 62.6, 156/62.8; 210/502.1, 503–505, 506, 508, 486, 489; 604/381–382, 365–366

[56] References Cited

U.S. PATENT DOCUMENTS 2,795,524  6/1957  Rodman ..................... 156/62.8 X
3,359,148  12/1967  Fukui .......................... 156/284 X

FOREIGN PATENT DOCUMENTS 048481  4/1978  Japan ................................ 156/284

Primary Examiner—David Simmons
Attorney, Agent, or Firm—Wood, Dalton, Phillips Mason & Rowe

[57] ABSTRACT

A filter media for use in a filter employed to separate water and particulate material from a liquid to be purified, such as a hydrocarbon fuel. The filter media includes a porous material such as glass fiber having a density sufficient to provide the desired mechanical filtration and which carries a water insoluble, water-absorbing material as, for example, a starch-polyacrylonitrile graft copolymer. Also disclosed is a filter employing the media and a method of making the media.

6 Claims, 7 Drawing Figures

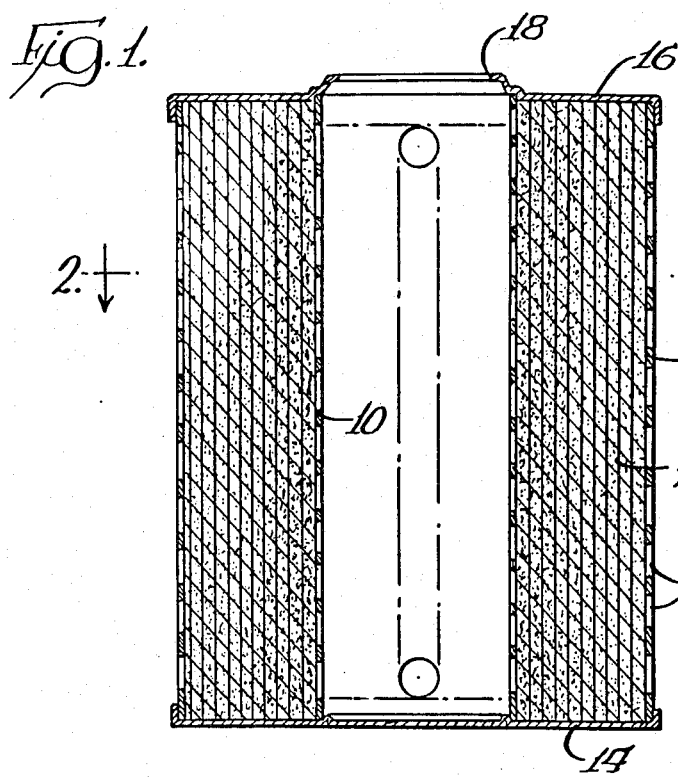
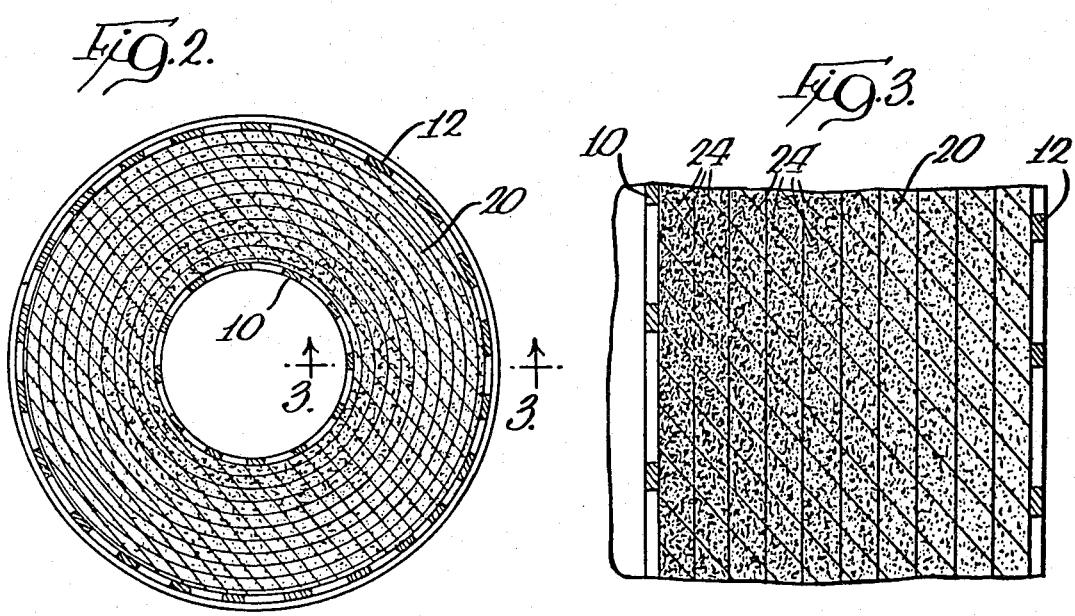

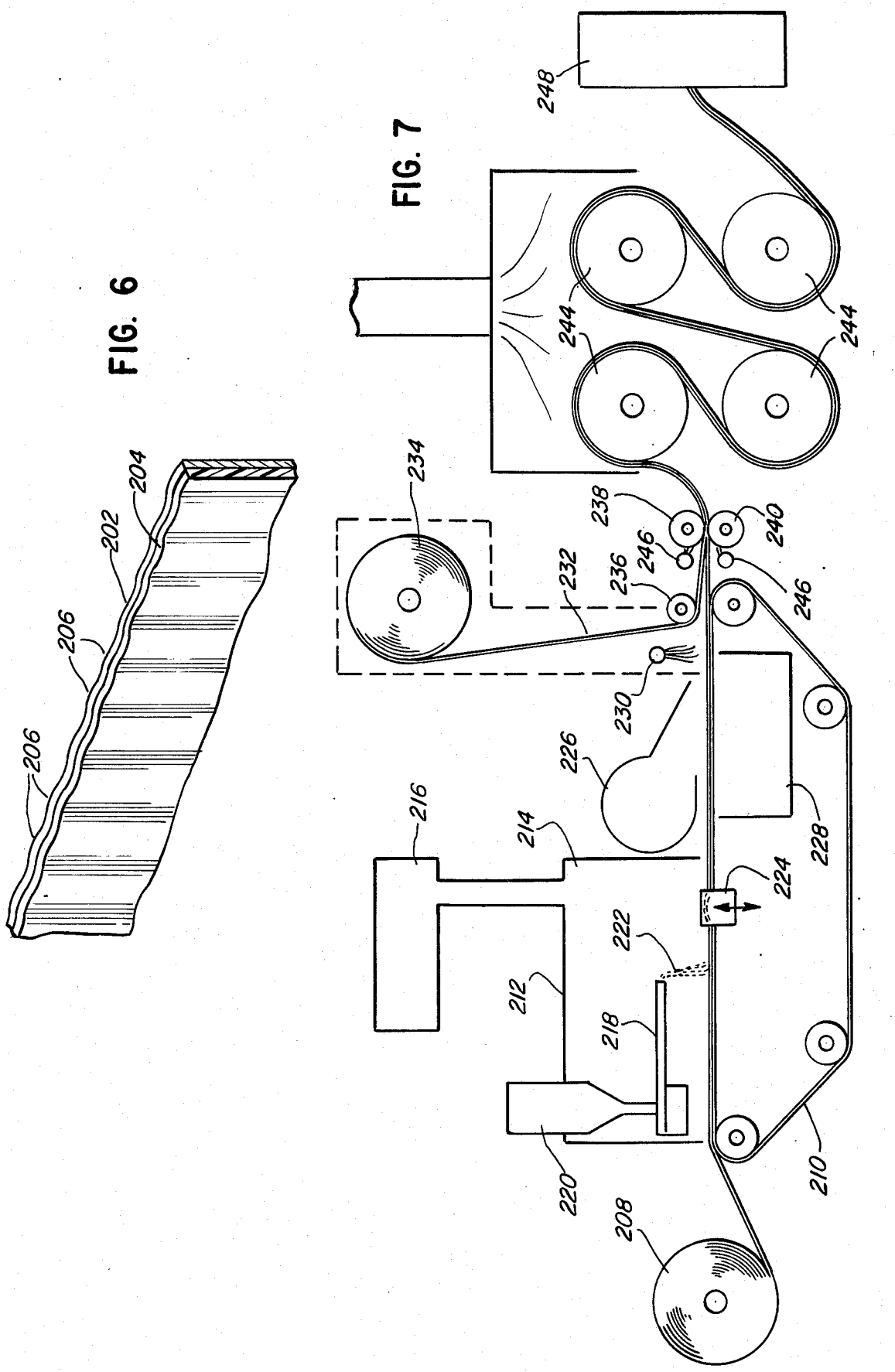

WATER REMOVING FILTER MEDIA AND METHOD OF MAKING THE SAME

CROSS REFERENCE

This is a division of application Ser. No. 447,909 filed Dec. 8, 1982, which is a continuation-in-part of my commonly assigned, copending application Ser. No. 413,981, filed Sept. 2, 1982 and entitled "Water Removing Filter Media and Method of Making the Same".

FIELD OF THE INVENTION

This invention relates to a filter media that may be employed in filters utilized in removing water from another liquid to be purified while mechanically purifying the liquid by the removal of particulate material therein as, for example, water in fuel, and a method of making such filter media.

BACKGROUND ART

Prior art of possible relevance includes the following U.S. Pat. Nos.: 3,589,364 issued June 29, 1971 to Dean et al.; 3,935,099 issued Jan. 27, 1976 to Weaver et al.; 3,981,100 issued Sept. 21, 1976 to Weaver et al.; 3,985,616 issued Oct. 12, 1976 to Weaver et al.; 3,997,484 issued Dec. 14, 1976 to Weaver et al.; 4,045,385 issued Aug. 30, 1977 to Fanta et al.; 4,134,863 issued Jan. 16, 1979 to Fanta et al., and 4,242,206 issued Dec. 30, 1980 to Estabrooke.

As is well-known, many liquids are desirably filtered prior to their use to mechanically separate impurities, generally in the form of particulate material, from the liquid. For example, in the case of fuel, such material can plug carburetor jets or injection nozzles and otherwise interfere with the operation of an internal combustion engine for utilizing the fuel. Thus, fuel is typically filtered at the time it is dispensed as, for example, at a service station, and is filtered again just prior to its use by a fuel filter associated with an internal combustion engine.

While such filters adequately rid the fuel of particulate contaminants by mechanical filtering, many are such as to permit liquid contaminants to remain with the fuel. A particularly disturbing liquid contaminant often found in fuel is water. Water, being noncombustible, can cause severe malfunction of an internal combustion engine and may damage expensive engine components, particularly fuel injectors. The hazards of water accumulation in fuel are perhaps best known to general aviation pilots who routinely, prior to initiating a flight, drain small amounts of fuel from low points in each fuel tank to inspect the same for the presence of water which could cause the aircraft engine to fail to develop full power or quit entirely at a critical moment in flight. The economical hazards of water in fuel are perhaps best known to owners or operators of diesel engines who have had fuel injection system components, which are quite expensive, damaged by the presence of water in the fuel. Many motorists have likewise been inconvenienced, particularly during the winter, by an automobile engine that refuses to start and/or run properly due to water in the fuel.

While water has been successfully removed from fuel prior to the present invention, the various means for accomplishing that result are frequently expensive, complex and/or inconvenient to use and/or replace.

The present invention is directed to overcoming one or more of the above problems.

SUMMARY OF THE INVENTION

It is a principal object of the invention to provide a new and improved filter media which may be advantageously employed in the mechanical filtering of a liquid and at the same time, absorb water contaminating such liquid; and to provide a method of making such a filter media.

According to one aspect of the invention, there is provided a filter media for use in filters employed to separate water and particulate material from a liquid to be purified. The filter media includes a porous filter material having a density sufficient to allow the liquid to be purified to flow therethrough and yet preclude the passage of particulate material. A water insoluble, water absorbing material is dispersed within and carried by the filter material.

In a highly preferred embodiment, the filter material is glass fiber to serve to coalesce water contained within the liquid to be purified.

A highly preferred embodiment contemplates that the water absorbing material be a starch-polyacrylonitrile graft copolymer.

A preferred method of making the filter media includes the steps of providing a fibrous mat of material adapted to mechanically separate particulate material from the liquid to be purified and thereafter applying starchpolycrylonitrile graft copolymer to the mat. The method is concluded by the step of fixing the copolymer to the mat.

In the preferred embodiment of the method, the step of fixing is performed by spraying the mat with a volatile solvent containing a small percentage of water. High proof alcohol is suitable for the purpose.

The inventive method also contemplates that the amount of copolymer applied to particular portions of the mat be varied in a predetermined fashion.

The step of applying may be performed by directing granular copolymer at one side of the mat while applying a partial vacuum to the opposite side of the mat. The method may be performed while continuously advancing the mat from an applying station to a fixing station.

The invention also contemplates a water absorbing mechanical filter including a filter housing with an inlet port and an outlet port. The housing further includes a means defining a liquid flow path from the inlet port to the outlet port. A body of fibrous material is disposed within the housing and extends across the flow path. A quantity of starch-polyacrylonitrile graft copolymer is disposed within the body of fibrous material.

Preferably, the copolymer is dispersed throughout the body and the distribution is such that there is more graft copolymer nearer the outlet port than nearer the inlet port.

Another facet of the invention concerns itself with a laminated water absorbing mechanical filter media. The laminate includes at least two fibrous layers bonded together by a water absorbing compound which serves to jointly bond the layers together and to absorb water in material passing through the filter media thus formed.

In one embodiment, the layers are formed of dissimilar materials such as fiberglass and filter paper.

The invention also contemplates a method of making such a laminated filter media including the steps of placing a water absorbing compound on at least the surface of a first fibrous mat, wetting the compound sufficiently to make the compound sticky at least at the surface of the mat, applying a second fibrous mat to the surface such that it contacts the compound while the compound is sticky, and drying the resulting laminate.

In a highly preferred embodiment, the step of applying also includes the step of pressing the mats together.

Other objects and advantages of the invention will become apparent from the following specification taken in connection with the accompanying drawings.

DESCRIPTION OF THE DRAWINGS

FIG. 1 is a sectional view of a filter made according to the invention and employing a filter media made according to the invention;

FIG. 2 is a sectional view of the filter taken approximately along the line 2—2 in FIG. 1;

FIG. 3 is an enlarged fragmentary sectional view taken approximately along the line 3—3 in FIG. 2;

FIG. 6 is a fragmentary perspective view of a further embodiment of a filter media made according to the invention; and FIG. 7 is a view of another apparatus useful in practicing the invention.

BEST MODE OF THE INVENTION

Figure 4:
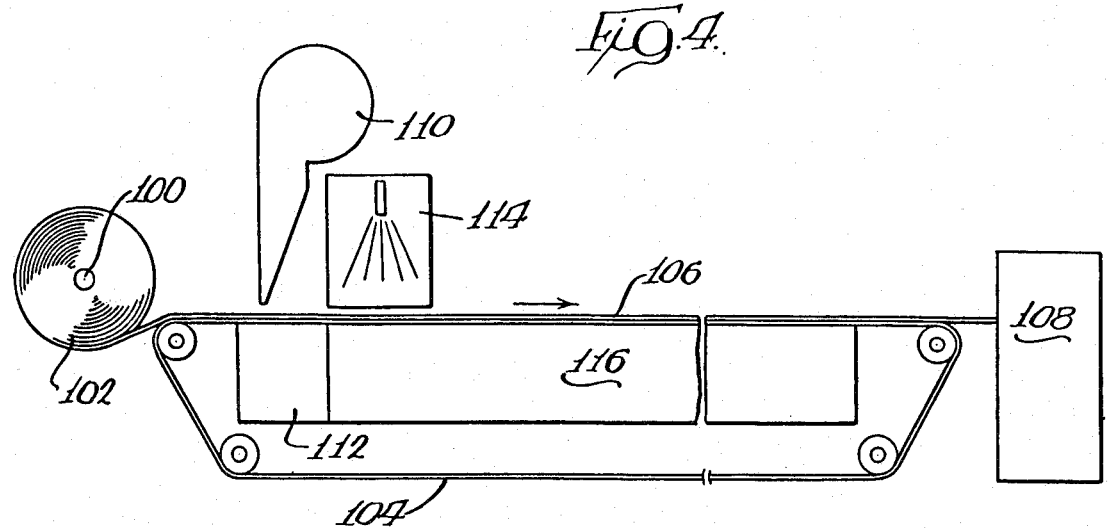
FIG. 4 is a view of one apparatus that may be utilized in performing the method of making the filter medias.

An exemplary embodiment of a filter made according to the invention utilizing a filter medium made according to the invention is illustrated in FIGS. 1–3 inclusive and is seen to be comprised of a housing including inner and outer perforated metal cylinders, 10 and 12 respectively, which are concentric with each other. As seen in FIG. 1, the cylinders 10 and 12 are of equal length and are maintained in concentric relation as by glueing to an imperforate, bottom disc 14 and a top disc 16 having a central opening 18 in fluid communication with the interior of the cylinder 10.

In the space between the cylinders 10 and 12, the filter media 20 is disposed. As illustrated, the filter media 20 is formed as a spirally wrapped mat or batt. However, it is to be understood that other configurations as, for example, a pleated configuration, could be em- ployed.

The discs 14 and 16 together with the cylinders 10 and 12 define a flow path for a liquid to be purified from an inlet defined by the opening 18 in the disc 16 to an outlet defined by the perforations 22 in the cylinder 12. Of course, if desired, the flow direction could be reversed.

According to the invention, the filter media 20 is formed of a porous material having a density sufficient to preclude the passage of particulate material in the fluid to be purified of a size greater than some predetermined minimum from the inlet 10 to the outlet 22. Preferably, the filter media 20 is fibrous in nature and formed of a material having surface properties such that extremely small droplets of water contained within the liquid to be purified will coalesce to form larger droplets. Glass fiber is preferred because of its ability to provide such coalescing action and because of its cost.

The porous material, of course, provides mechanical filtering action as alluded to previously and also carries a water-insoluble, water-absorbing material which is operative to absorb water droplets coalesced by the porous material. Such water-insoluble, water-absorbing material is shown in the form of granules 24 dispersed throughout a glass fiber mat.

A highly preferred water-insoluble, water-absorbing material is a starchlike composition, preferably a starch-polyacrylonitrile graft copolymer such as disclosed in the previously-identified Weaver et al. and Fanta et al. United States Letters patents. Though less preferred, powdered or granular forms of the water insoluble, cross linked, carboxymethyl cellulose compounds disclosed in the previously identified Dean et al patent may be employed. In a highly preferred embodiment, the density of the granules 24 is greater near the outlet than near the inlet as shown in FIG. 3. Because the granules 24 will swell appreciably as they absorb water, it is desirable that their density be reduced near the inlet so as not to cause premature clogging of the filter due to the swelling of the granules.

The actual density of the granules 24 to a given quantity of glass fiber may vary dependent upon the ultimate use to which the filter media is put and the intended life expectancy. However, in general, it is preferred that the granules 24 be present in sufficient amount so that, as their absorptive capacity is approached, they will have swollen sufficiently so as to preclude all flow through the filter. The lack of such flow may then be taken by the user of the filter as an indication that the filter ought to be changed.

Specific densities that have proved to be satisfactory when utilized on fiberglass batting available from John Manville TYPE AF-11-¼" with a starch copolymer known as WATER-LOCK A-100 available from Grain Processing Corp. range from 95 grams per square meter to 225 grams per square meter measured at 60% relative humidity and 70° F. Success has also been achieved using densities ranging from 90 grams per square meter to 220 grams per square meter on John Manville fiberglass TYPE AF-4-¼" employing a starch copolymer known as WATER-LOCK A-120, also available from Grain Processing Corp.

Figure 5:
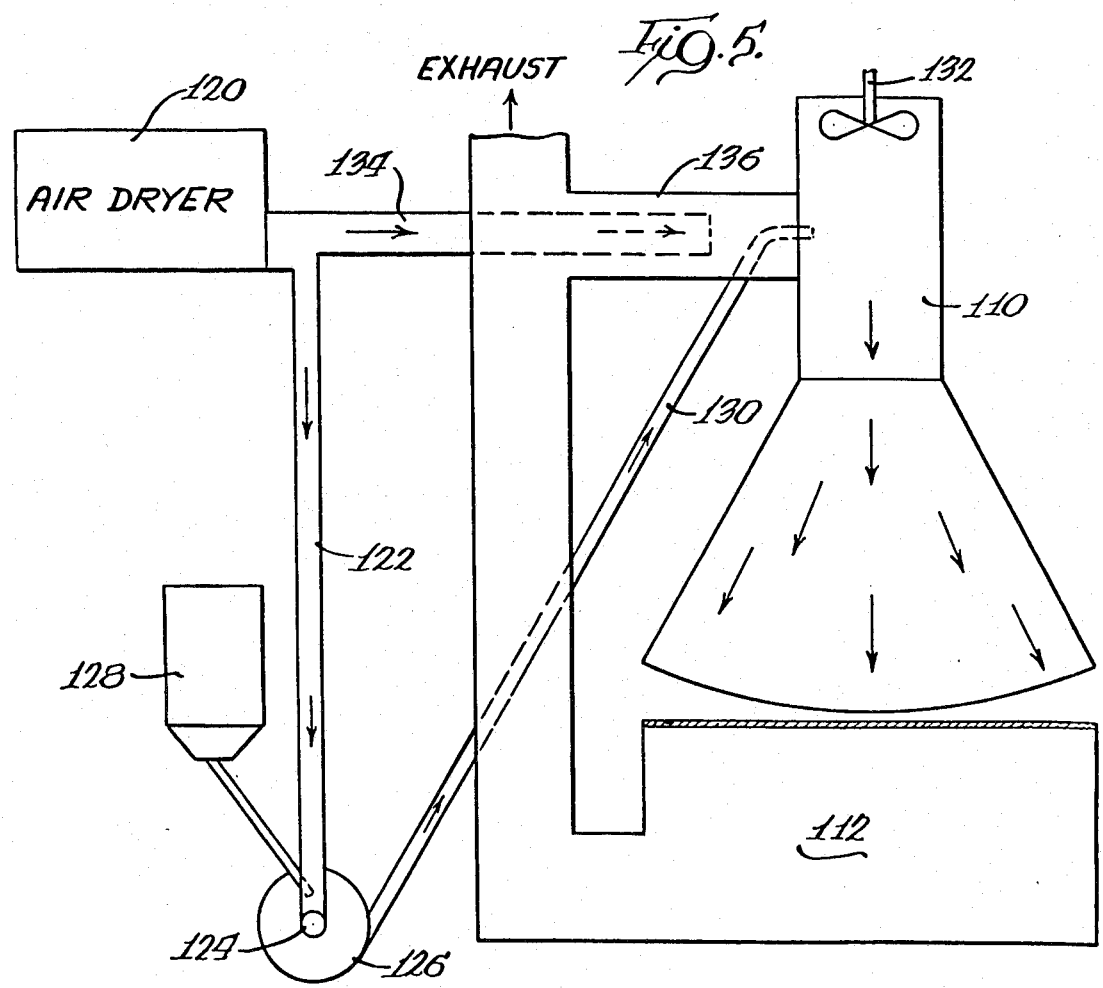
FIG. 5 is another view of the apparatus illustrated in FIG. 4 and showing additional components thereof.

Referring now to FIGS. 4 and 5, method and apparatus for making the filter media are illustrated. With reference to FIG. 4, there is shown a rotatable spindle 100 on which is received a roll 102 of the porous mechanical filtering material in batt form. A perforate belt conveyor 104 has an upper run 106 moving from left to right as viewed in FIG. 4 which carries the batt being taken off the roll 102 to a collection station 108 which may be of any desired type.

Near the left-hand end of the upper run 106 there is a granule applicator 110 which, as will be seen, is operative to direct the granules 24 (FIG. 3) downwardly toward the batt of porous filter material. Just below the upper run 106 of the belt and below the applicator 110 is a collection manifold 112 for collecting any of the granular material that passes through both the batt and the upper run 106 of the conveyor 104.

Immediately following the applicator 110 is a spray chamber 114 located above the upper run 106 of the belt. An elongated exhaust manifold 116 is disposed below the belt from the point of the spray chamber 114 to the end of the upper run 106 and may be exhausted in any suitable fashion.

The spray chamber 114 directs a highly volatile solvent containing a small amount of water at the batt containing the granules after application of the same by the applicator 110. A preferred volatile solvent having the above characteristics is 190 proof methanol. The methanol, upon contacting the batt, causes the granules 24 to be fixed to the fibers thereof and then is immediately flashed off due to its high volatility and collected by the exhaust manifold 116.

While the precise limits of water content in the volatile solvent have not been ascertained, it has been found that there will be no fixation of the granules if 200 proof, or pure solvent, is used. Similarly, at proofs of approximately 150 or less, it has been found that granules on the surface of the batt will collect so much water from the solvent as to form a virtually impenetrable layer which precludes the solvent from entering the interstices of the batt to set granules on the interior of the batt to adjacent fibers.

As an alternative, other fluids containing a low percentage of water may be used. For example, a gas high in humidity as for example, air at 80-90% relative humidity, may be directed through the batt after the granules have been dispersed therein to fix the granules to the adjacent fibers.

FIG. 5 illustrates in greater detail, the nature of the applicator 110. The system includes an air dryer or dehumidifier 120 as air is employed to propel the granules toward the batting. If ambient air conditions are such that relative humidity is rather high, difficulty may be encountered in the granules sticking together or agglomerating on a surface of the batt rather than penetrating the same. Thus, the use of the air dryer 120 allows application independently of ambient air conditions.

The dried air output is split into two fractions with one being directed by a conduit 122 to the inlet 124 of a high pressure radial blade blower 126. A conventional gear type powder dispenser 128 provides, at a predetermined rate, the granules 24 to the inlet 124 of the blower 126 and the resulting stream of granules and dried air is propelled through a conduit 130 to the upper end of the applicator 110. The applicator 110 includes a blower 132 which receives dried air from the air dryer 120 and which is operative to direct the granules downwardly such that they penetrate the fiber batt.

It will be observed that the stream of dried air from the air dryer 120 directed to the applicator 110 is via a conduit 134 which is fitted within a conduit 136. The conduit 136 is connected to a suitable exhaust system as desired. In any event, an ejection system is formed such that a vacuum will exist below the upper run 106 of the belt in the vicinity of the applicator 110 to assist in drawing the granules fully into the fiberglass matting.

Variations of the density of application of granules to the porous filter material can be achieved by varying the rate of operation of the dispenser 128 and/or the lineal rate of travel of the conveyor belt 104.

A modified embodiment of filter media made according to the invention is illustrated in FIG. 6 and is seen to include a laminate of first and second layers 202 and 204 which are porous in nature, and preferably fibrous. Additional layers may be employed as desired and though not necessary to the invention, in general, the layers 202 and 204 will be formed of dissimilar materials. For example, the layer 202 may be a fiberglass batt while the layer 204 may be a cellulose based material as, for example, filter paper. The selection of particular components will, of course, depend upon intended use of the media.

As illustrated, the laminate may be corregated as at 206. The layers 202 and 204 are held together by the presence of water-insoluble, water-absorbing compounds of the types previously mentioned. In other words, the water absorbing compound not only serves to absorb water in a liquid passing through the media in a filter in which it is employed, but additionally serves to bond the layers 202 and 204 together. This is accomplished by applying the water absorbing compound at least to the surface of one of the layers 202 and 204 and thereafter wetting the compound sufficiently so as to cause the compound at the surface to become sticky. The other of the layers 202 and 204 is then applied to the sticky compound. The water is then extracted from the resulting assemblage. This can be accomplished by drying or by chemical extraction, or combinations thereof.

Preferably, to insure a good bond, the layers 202 and 204 are pressed together during the step of applying one to the other.

FIG. 7 illustrates an apparatus that may be utilized in forming the filter media illustrated in FIG. 6 as well being useful in forming the filter media illustarted in FIGS. 1-3, inclusive. Specifically, a roll of fiberglass batting 208 of the character previously mentioned is unrolled and carried via a conveyor 210 to a water absorbing compound applying station 212. The station 212 includes a housing 214 overlying the upper run of the conveyor 210 which is dehumidified by a dehumidifier 216. Within the housing 214 is a vibratory feeder 218 receiving the water-absorbing compound in powder or granular form from a hopper 220. The vibratory feeder 218 evenly distributes the compound, shown at 222, on the upper surface of the unrolled fiberglass.

The conveyor carrying the fiberglass with the granular material 222 applied then passes over a vibrator 224 which causes the powder to disperse within the fiberglass batt. It will be appreciated from the foregoing description that the dehumidifier 216 serves to keep the granular material 222 from absorbing sufficient atmospheric water as to become sticky and not disperse within the batt of fiberglass.

The conveyor 210 causes the mat to exit the housing 214 and travel to a fixing station 226 whereat a relatively high humidity gas is directed through the fiberglass mat to an exhaust system 228. Typically, the gas may be air at a relative humidity on the order of 80 or 90%. As mentioned previously, the use of such a high humidity gas is an alternative to the application of a volatile solvent containing a low percentage of water and in fact is the application of a fluid containing a low percentage of water to accomplish the same purpose of fixing the granules to adjacent fibers.

After the fixing station 226 has been passed, the fiberglass batt with the granules dispersed throughout and fixed thereto passes to a wetting station 230 which may be defined by a spray nozzle spraying water on the upper surface of the batt sufficiently to cause the water absorbing compound thereat to become sticky. This will occur simply because the compound is absorbing water sprayed upon it from the spray nozzle 230.

With the upper surface of the fiberglass layer now in a sticky condition, a layer such as a filter paper layer 232, which may have been previously corrugated if desired, from a roll 234 is taken about a roller 236 and applied to the upper surface of the fiberglass mat. The two juxtaposed layers are pressed together by conventional rollers 238 and 240 which act to form the laminate. The pressing action provided by the rollers 238 and 240 causes the sticky water absorbing compound at the interface of the layers to make intimate contact with the fibers in both materials.

Water is then extracted from the resulting laminate in a dryer 242 which may be of the drum dryer type having a plurality of drums 244 about which the laminate is trained and which are heated as by hot water to a temperature of, for example, 140°. With the water extracted from the laminate, a secure bond between the filter paper and the fiberglass is accomplished. It will be recognized that in order to achieve such a bond, it is not necessary that the water absorbing compound be dispersed in either one of the layers forming the laminate. It is only necessary that the material be located at the interface of the two. However, in many cases, if no more is done, there may be insufficient quantities of the water-absorbing material in the resulting assemblage to provide a filter capable of absorbing large amounts of water.

In some cases, water extraction may be enhanced by spraying the rolls 238 and 240 with a water absorbing liquid. As seen in FIG. 7, spray nozzles 246 are employed for the purpose. During the pressing action on the material provided by the rolls 238 and 240, the water-absorbing liquid sprayed by the spray nozzles 246 contact the wet water-absorbing granules and absorb water therefrom. The water-absorbing liquid and the water are then driven off within the dryer 242.

The resulting media is then placed in suitable form for transportation and/or storage as, for example, in a rewind station shown schematically at 248. The media can be rolled and inserted in a filter as shown in FIGS. 1-3 or pleated and placed in a filter in a conventional fashion, or made into a combination rolled and pleated filter, as desired.

INDUSTRIAL APPLICABILITY

From the foregoing, it will be appreciated that a filter media made according to the invention provides for both mechanical filtering and water absorption in an inexpensive and economical fashion. The filter employing the media can be constructed and arranged to provide an automatic indication that its useful life has been completed in terms of the ability of the filter media to swell and halt fluid flow therethrough. The method of making the filter media employs relatively inexpensive materials such as methanol.

Moreover, the invention provides a means of providing a laminated filter media which can be economically constructed. A particular feature of the laminated media is the fact that the water absorbing compound, which must be present in any event to perform the function of water absorbing in a filter, provides the additional function of bonding the two layers of the laminate together avoiding the need for glue or other adhesives.

I claim:

1. A method of making a laminated, water absorbing mechanical filter media comprising the steps of:
    placing a water absorbing polymer in granular form on a fiberglass mat;
    dispersing the polymer in the mat;
    wetting the polymer with water at a surface of the mat sufficiently to make said surface sticky;
    applying a layer of filter paper to said surface while said surface is sticky;
    pressing the mat and the layer together to cause the polymer to contact the layer; and
    extracting sufficient water from the resulting laminate to cause the polymer to secure the mat and the layer together.

2. The method of claim 1 further including the step of fixing the polymer to the glass fibers in said mat by passing a fluid having a low percentage of water through the mat.

3. The method of claim 2 wherein the fluid is a gas.

4. The method of claim 2 wherein the fluid is a volatile liquid.

5. The method of claim 1 wherein the steps of placing and dispersing are performed concurrently.

6. The method of claim 1 wherein the steps of placing and dispersing are performed seriatum.

* * * * *